United States Patent
Tokumoto et al.

(10) Patent No.: US 7,370,541 B2
(45) Date of Patent: May 13, 2008

(54) TORQUE DETECTING APPARATUS

(75) Inventors: Yoshitomo Tokumoto, Nabari (JP); Shunsuke Nakaura, Gose (JP); Ken Fukuda, Toyota (JP)

(73) Assignee: JTEKT Corporation, Osaka (JP)

( * ) Notice: Subject to any disclaimer, the term of this patent is extended or adjusted under 35 U.S.C. 154(b) by 110 days.

(21) Appl. No.: 11/290,557

(22) Filed: Dec. 1, 2005

(65) Prior Publication Data

US 2006/0117870 A1 Jun. 8, 2006

(30) Foreign Application Priority Data

Dec. 2, 2004 (JP) ............................. 2004-349832

(51) Int. Cl.
*G01L 3/10* (2006.01)
(52) U.S. Cl. ................................. 73/862.331
(58) Field of Classification Search ............ 73/862.331
See application file for complete search history.

(56) References Cited

U.S. PATENT DOCUMENTS 4,657,103 A   4/1987  Shimizu
4,660,671 A   4/1987  Behr et al.
4,918,744 A * 4/1990  Shimizu ..................... 388/833
5,052,232 A * 10/1991 Garshelis ............... 73/862.336
2002/0190709 A1* 12/2002 Frederick et al. ........ 324/207.2

FOREIGN PATENT DOCUMENTS

JP   4-53748 B2   8/1992
JP   8-18564 B2   2/1996
JP   3094483 B2   8/2000

* cited by examiner

*Primary Examiner*—Edward Lefkowitz
*Assistant Examiner*—Punam Patel
(74) *Attorney, Agent, or Firm*—Birch, Stewart, Kolasch & Birch, LLP

(57) ABSTRACT

A torque detecting apparatus detects torque applied upon a torsion bar of an electric power steering apparatus, as two sensors, which have ratiometric characteristics and have the same characteristics, simultaneously detect the amount of torsion of the torsion bar. With a gain of one of the two sensors set to the positive polarity and a gain of the other sensor set to the negative polarity, a control circuit calculates the torque applied upon the torsion bar by multiplying a difference between detection outputs from the two sensors by a predetermined coefficient. A torque detecting apparatus which is capable of detecting the torsional angle of a rotation shaft, namely, torque applied upon the rotation shaft easily and accurately using two sensors is thus realized.

4 Claims, 3 Drawing Sheets

TORQUE DETECTING APPARATUS

CROSS-REFERENCE TO RELATED APPLICATIONS

This Nonprovisional application claims priority under 35 U.S.C. §119(a) on Patent Application No. 2004-349832 filed in Japan on Dec. 2, 2004, the entire contents of which are hereby incorporated by reference.

BACKGROUND OF THE INVENTION

1. Field of the Invention

The present invention relates to a torque detecting apparatus which detects an amount of torsion of a shaft using a sensor and detects the torque applied upon the shaft.

2. Description of Related Art

An ordinary automobile comprises a power steering apparatus to make it possible for a driver to reduce the operation power applied upon a steering wheel and make it easy for the driver to drive his automobile while he operates the steering wheel, that is, during steering, and in recent years, an ordinary automobile often comprises an electricity-powered steering apparatus (electric power steering apparatus). An electric power steering apparatus is structured such that as the torque generating in response to rotations of a steering wheel is detected, a driver's steering intention such as the steering direction and the steering amount is determined, and based on this result, a steering assisting electric motor is turned ON/OFF and the rotation force while this motor is ON is adjusted.

By the way, the torque which generates as a driver rotates a steering wheel is detected usually as the amount of torsion of a torsion bar which connects two halves of a steering shaft along the longitudinal direction of the steering shaft which rotates as the steering wheel rotates. Various types of sensors are usable to detect the amount of torsion of such a torsion bar and a Hall-effect sensor is one of them.

A magnet is fixed to an object whose amount of torsion is to be detected, namely, a movable object and a Hall-effect sensor is usually disposed at a fixed position. From a voltage outputted from the Hall-effect sensor in accordance with the positions of the Hall-effect sensor and the magnet relative to each other when a reference voltage is applied upon the Hall-effect sensor, the relationship between the positions of the Hall-effect sensor and the magnet is detected.

Since a characteristic of a Hall-effect sensor is that its gain, midpoint or the like varies depending upon a change of a power source voltage, even when the result of detection is the same, a change of the power source voltage changes an output voltage. Due to this, it has been difficult to use a Hall-effect sensor as a torque sensor for an electric power steering apparatus.

A conventional electric power steering apparatus is equipped with the so-called failsafe function of detecting with two sensors whose characteristics are identical substantially at the same time for detection of the amount of torsion of a torsion bar, determining that some abnormality has occurred when the two sensors have detected differently and prohibiting steering assisting by the power steering apparatus.

As such a failsafe function of an electric power steering apparatus which uses torque sensors to handle abnormality, there are known techniques such as those described in Japanese Patent Publication No. 4-53748 (1992), Japanese Patent No. 3094483 and Japanese Patent Publication No. 8-18564 (1996). These will now be described specifically.

Assuming that the actual value of the power source voltage $V_{cc}$ which is supplied in common to the two sensors, the output voltage from the first sensor is $V_{T1}$ and that from the second is $V_{T2}$. In this case, the output voltages $V_{T1}$ and $V_{T2}$ from the two sensors are expressed by equations (1) and (2) below:

$$V_{T1} = (a \times \theta + (V_{cc}/2)) \times (V_{cc}/V_{ref}) \quad (1)$$

$$V_{T2} = (-a \times \theta + (V_{cc}/2)) \times (V_{cc}/V_{ref}) \quad (2)$$

Where, $\theta$: amount of torsion of the torsion bar
a: constant (gain)
$V_{ref}$: reference voltage (e.g., 5 V) for the sensors
$V_{cc}/V_{ref}$: ratiometric constant of the sensors $V_{T1} = -V_{T2}$ should hold from the equations (1) and (2) in principle and particularly when the torsional angle $\theta$ of the torsion bar is zero, $V_{T1} = V_{T2}$ and it then follows that the output characteristics of the two sensors are cross-characteristics.

In light of this, sensor clump voltages common to the two sensors are determined as follows.

$V_{clumpH}$: sensor output upper limit voltage
$V_{clumpL}$: sensor output lower limit voltage Hence, it is judged there is something wrong with the first sensor when $V_{T1} << V_{clumpL}$ or $V_{T1} >> V_{clumpH}$, whereas when $V_{T2} << V_{clumpL}$ or $V_{T2} >> V_{clumpH}$, it is judged there is something wrong with the second sensor.

It is also possible to judge in the manner below whether the voltages fed to the sensors from the power source are abnormal. That is, an equation (3) holds true from the above equations (1) and (2).

$$V_{T1} + V_{T2} = (V_{cc}^2/V_{ref}) \quad (3)$$

Assuming that $V_{cc}$, namely the power source voltage is a constant value, since $V_{ref}$ is a constant, "$V_{T1} + V_{T2}$" should also be a constant value. However, "$V_{T1} + V_{T2}$" may not yield a constant value, as the detection accuracies of individual sensors are slightly different from each other. Hence, an upper limit value ($V_{max}$) and a lower limit value ($V_{min}$) which are obtained by slightly widening "$V_{cc}^2/V_{ref}$" are set as threshold values, and it is decided that (the absolute values of) the output voltages from the two sensors are about the same as long as "$V_{T1} + V_{T2}$" stays within a range which satisfies an equation below. In short, when the equation below is not met, it is judged that there is a major error in the output from any one of the sensors (and in some cases, in the outputs from the both sensors):

$$V_{min} < V_{T1} + V_{T2} < V_{max}$$

Where it is assumed that $V_{cc} = V_{ref}$, i.e., when the actual power source voltage is equal to the reference voltage for the sensors, $V_{T1} + V_{T2} = V_{cc}$. In other words, the total of the outputs from the both sensors becomes equal to the power source voltage. Hence, monitoring of the value (voltage value) $V_{T1} + V_{T2}$ realizes whether the power source voltage is abnormal.

Each of the structures according to the conventional techniques mentioned earlier is that as for the sensor outputs, one of the two sensors is used as a main sensor, the above mentioned abnormality detection is executed, and when it is judged that there is nothing abnormal about the output voltages from the both sensors or the power source voltage, the output voltage from the main sensor is used as the sensor output. Hence, the power source voltage could vary to such an extent which can not be regarded abnormal, which may be inevitable in the case of abnormality occurring in the sensors themselves. However, according to the conventional techniques mentioned earlier, even a change of the power source voltage to such an extent which can not be regarded abnormal will be judged as an abnormal power source voltage and will operate the failsafe function.

BRIEF SUMMARY OF THE INVENTION

The present invention has been made in light of this and aims at providing a torque detecting apparatus which uses two sensors and can detect torque even despite a change of a power source voltage which is not large enough to be determined abnormal.

A torque detecting apparatus according to the first aspect of the present invention is a torque detecting apparatus for detecting torque applied upon a rotation shaft by means of two sensors which simultaneously detect an amount of torsion of the rotation shaft, and is characterized in that the two sensors have ratiometric characteristics and have the same characteristics, and the torque applied upon the rotation shaft is calculated based on a difference between detection outputs from the two sensors by setting gains of the two sensors to the opposite polarities to each other.

In the torque detecting apparatus according to the first aspect of the present invention, two sensors both having ratiometric characteristics and having the same characteristics simultaneously detect the same amount of torsion of the same rotation shaft. At this time, as the gains of the two sensors are set to the opposite polarities to each other, that is, as the gain of one sensor is set to the positive polarity while the gain of the other sensor is set to the negative polarity, a difference between the detection outputs of the two sensors becomes twice as large as the detection output of one of the sensors. It is therefore possible to calculate the torque applied upon the rotation shaft from the difference between the detection outputs of the two sensors.

Hence, although it has been difficult to use a sensor whose characteristic is that its output voltage is changed by a change of a power source voltage, such as a Hall-effect sensor, as a sensor for a torque detecting apparatus of an electric power steering apparatus, the torque detecting apparatus according to the first aspect of the present invention permits use of such a sensor as a highly accurate sensor.

A torque detecting apparatus according to the second aspect of the present invention is a torque detecting apparatus, comprising: two sensors; and calculating means for calculating torque applied upon a rotation shaft being an object to be detected based on detection outputs of the two sensors, and characterized in that a power source voltage is supplied to each of the two sensors, the two sensors output as their detection outputs voltage signals changed from a predetermined reference voltage in accordance with an amount of torsion of the rotation shaft when the reference voltage is equal to the power source voltage, and output as their detection outputs voltage signals changed from voltage signals, which are changed from the reference voltage in accordance with an amount of torsion of the rotation shaft, in accordance with a ratio between the reference voltage and the source voltage when the reference voltage and the power source voltage are different from each other, gains of the two sensors are set to the opposite polarities to each other, and the calculating means calculates the torque applied upon the rotation shaft by multiplying a difference between the detection outputs from the two sensors obtained simultaneously detecting the amount of torsion of the same rotation shaft by a predetermined coefficient.

In the torque detecting apparatus according to the second aspect of the present invention, since the gains of two sensors are set to the opposite polarities to each other, that is, as the gain of one sensor is set to the positive polarity while the gain of the other sensor is set to the negative polarity, a difference between the detection outputs of the two sensors becomes twice as large as the detection output of one of the sensors when a reference voltage is equal to a power source voltage. It is therefore possible to calculate the torque applied upon a rotation shaft from the difference between the detection outputs of the two sensors, and even when the reference voltage is different from the power source voltage, the two sensors output as their output signals voltage signals changed from voltage signals in accordance with a ratio between the reference voltage and the power source voltage, and hence, it is possible to calculate the torque as same as above mentioned even when the reference voltage is different from the power source voltage.

Hence, although it has been difficult to use a sensor whose characteristic is that its output voltage is changed by a change of a power source voltage, such as a Hall-effect sensor, as a sensor for a torque detecting apparatus of an electric power steering apparatus, the torque detecting apparatus according to the second aspect of the present invention permits use of such a sensor as a highly accurate sensor even when the power source voltage is different from the reference voltage.

The above and further objects and features of the invention will more fully be apparent from the following detailed description with accompanying drawings.

DETAILED DESCRIPTION OF THE PRESENT INVENTION

Figure 1:
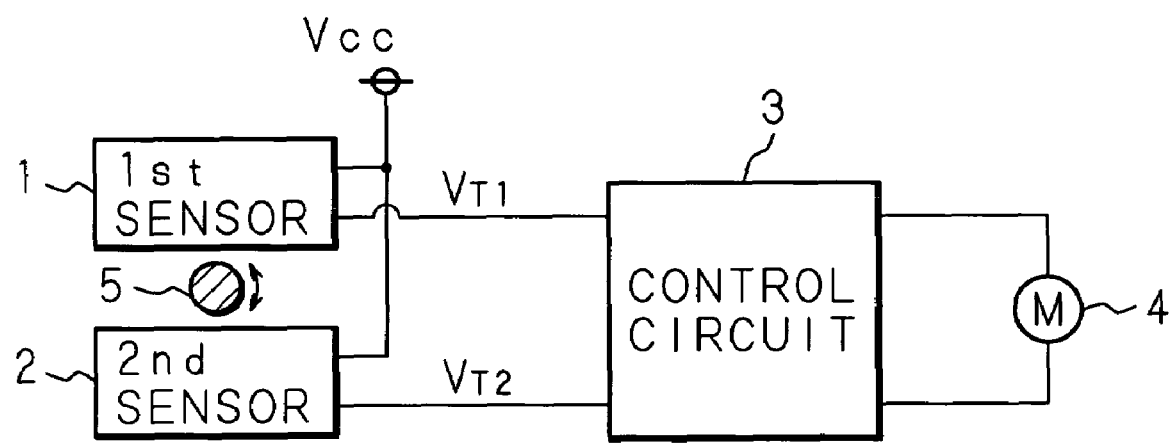
FIG. 1 is a block diagram which shows a configuration example of an essential portion as it is when a torque detecting apparatus according to the present invention is built within an electric power steering apparatus.

An embodiment of the present invention will now be described with reference to the associated drawings. FIG. 1 is a block diagram which shows a configuration example of an essential portion as it is when a torque detecting apparatus according to the present invention is built within an electric power steering apparatus.

A basic structure of an electric power steering apparatus itself is well known. Hence, shown in FIG. 1 are two sensors (a first sensor 1 and a second sensor 2) which detect an amount of torsion of a torsion bar 5 and a control circuit 3 which receives voltage signals outputted from the two sensors 1 and 2, calculates the torque and controls driving of a steering assisting electric motor 4 in accordance with the calculated result.

The two sensors 1 and 2 are both Hall-effect sensors and structured to have ratiometric characteristics and also have the same characteristics. As the equations (1) and (2) above denote, the gains of the two sensors 1 and 2 themselves are identical values but are set to the opposite polarities to each other, that is, one is set to the positive polarity while the other is set to the negative polarity. Further, the power source voltage $V_{cc}$ is supplied from the same power source to the two sensors 1 and 2, and the two sensors 1 and 2 detect the amount of torsion of the torsion bar 5 simultaneously, that is, substantially at the same time, respectively, then output voltage signals $V_{T1}$ and $V_{T2}$ corresponding to the detection results, and supply them to the control circuit 3.

In addition, a ratiometric characteristic is such a characteristic that an output voltage as well changes in proportion to and in accordance with a change of a power source voltage.

The control circuit 3, though its detail will be described later, calculates the torque applied upon the torsion bar 5 based on the voltage signals $V_{T1}$ and $V_{T2}$ fed from the two sensors 1 and 2 and outputs a control signal which corresponds to the calculated torque, thereby driving the steering assisting electric motor 4 under its control.

Figure 2:
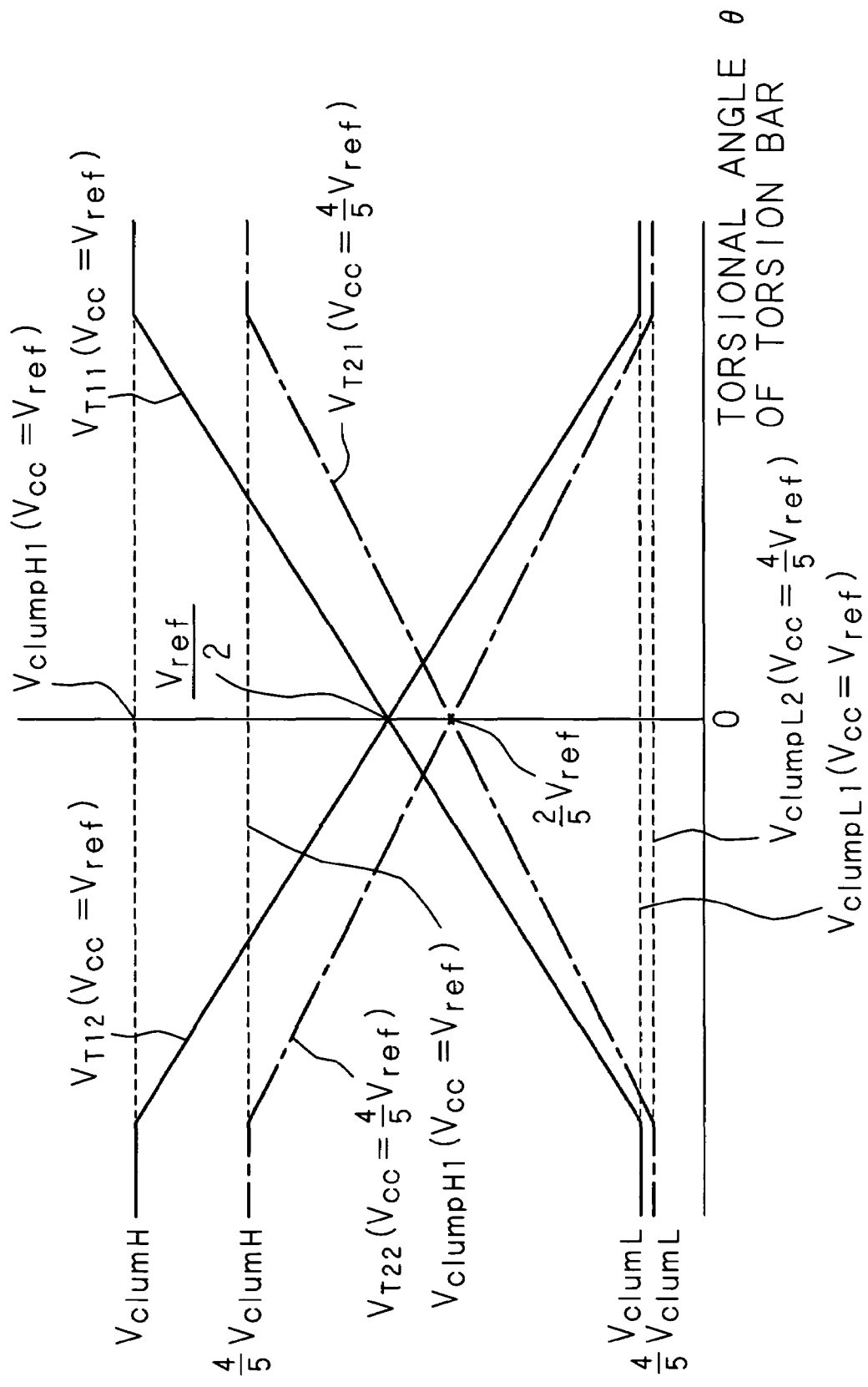
FIG. 2 is a graph which shows output voltages from two sensors as they are when a sensor reference voltage $V_{ref}$ is equal to a power source voltage $V_{cc}$ and when the power source voltage $V_{cc}$ has dropped 20% from the sensor reference voltage $V_{ref}$ for example.

FIG. 2 is a graph which shows the output voltages from the two sensors 1 and 2 as they are when the sensor reference voltage $V_{ref}$ is equal to the power source voltage $V_{cc}$ and when the power source voltage $V_{cc}$ has dropped 20% from the sensor reference voltage $V_{ref}$ for example, i.e., when the power source voltage $V_{cc}$ is $4/5$ of the sensor reference voltage $V_{ref}$.

In FIG. 2, the abscissa expresses the torsional angle θ of the torsion bar 5 while the ordinate expresses the output voltages from the sensors. $V_{T11}$ indicated by a solid line denotes the output voltage from the first sensor 1 corresponding to the torsional angle θ of the torsion bar 5 when the power source voltage $V_{cc}$ is equal to the sensor reference voltage $V_{ref}$, and $V_{T12}$ indicated by a solid line denotes the output voltage from the second sensor 2 corresponding to the torsional angle θ of the torsion bar 5 when the power source voltage $V_{cc}$ is equal to the sensor reference voltage $V_{ref}$. $V_{T21}$ indicated by an alternate long and short dash line denotes the output voltage from the first sensor 1 corresponding to the torsional angle θ of the torsion bar 5 when the power source voltage $V_{cc}$ is $4/5$ of the sensor reference voltage $V_{ref}$, and $V_{T22}$ indicated by an alternate long and short dash line denotes the output voltage from the second sensor 2 corresponding to the torsional angle θ of the torsion bar 5 when the power source voltage $V_{cc}$ is $4/5$ of the sensor reference voltage $V_{ref}$.

As shown in FIG. 2, with the gains of the two sensors both having ratiometric characteristics and the same characteristics set to the opposite polarities to each other, that is, one gain set to the positive polarity while the other gain set to the negative polarity, when the power source voltage $V_{cc}$ is equal to the sensor reference voltage $V_{ref}$, midpoints (when an object to be detected is located at a neutral position, that is, when the torsional angle θ of the torsion bar 5 is zero in this example) coincide with each other and become ½ of the sensor reference voltage $V_{ref}$.

Further, in the case of a sensor having a ratiometric characteristic, when the power source voltage $V_{cc}$ is different from the sensor reference voltage $V_{ref}$, an output voltage of the sensor changes in proportion to the degree of the difference between the power source voltage $V_{cc}$ and the sensor reference voltage $V_{ref}$. Hence, when the power source voltage $V_{cc}$ is $4/5$ of the sensor reference voltage $V_{ref}$, the output voltages from the two sensors 1 and 2 denoted by the alternate long and short dash lines in FIG. 2 become $4/5$ of what they are when the power source voltage $V_{cc}$ is the same as the reference voltage $V_{ref}$. Therefore, the midpoints of the output voltages of both the sensors 1 and 2 coincide with each other at ½ of the power source voltage $V_{cc}$ and both the output voltages at the midpoints are $2/5$ of the reference voltage $V_{ref}$.

By the way, a relationship between the output voltages from the sensors 1, 2 and the torsional angle θ (torque) of the torsion bar 5 is determined assuming that the power source voltage $V_{cc}$ is equal to the reference voltage $V_{ref}$ for the sensors 1 and 2. Due to this, in a condition that the power source voltage $V_{cc}$ is different from the reference voltage $V_{ref}$ for the sensors 1 and 2, it is not possible to calculate the torsional angle θ (torque) of the torsion bar 5 from the output voltages of the sensors 1 and 2.

Figure 3:
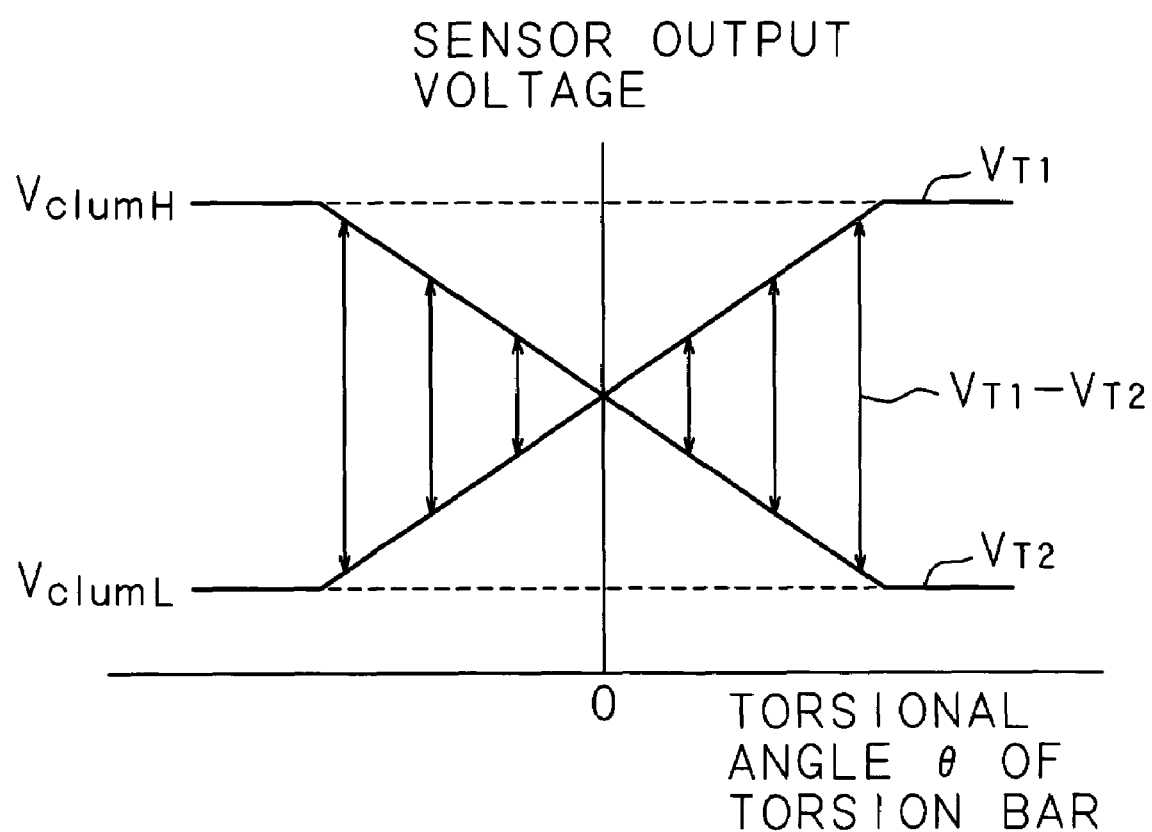
FIG. 3 is a graph which shows, for simplifying description in relation to FIG. 2, voltage signals $V_{T1}$ and $V_{T2}$ which are outputted from the two sensors as they are when the sensor reference voltage $V_{ref}$ is the same as the power source voltage $V_{cc}$.

FIG. 3 is a graph which shows, for simplifying description in relation to FIG. 2, the voltage signals $V_{T1}$ and $V_{T2}$ which are outputted from the two sensors 1 and 2 as they are when the sensor reference voltage $V_{ref}$ is the same as the power source voltage $V_{cc}$.

From FIG. 3, it is clear that when the reference voltage $V_{ref}$ for the sensors 1 and 2 is equal to the power source voltage $V_{cc}$, a difference between the output voltages of the two sensors 1, 2 and the torsional angle θ of the torsion bar 5 are in a direct proportional relationship. This is because the output voltages of the two sensors 1 and 2, when not reaching clump voltages, are in direct proportion to the torsional angle θ of the torsion bar 5, and so the difference between the output voltages of the two sensors 1 and 2 is in direct proportion to the torsional angle θ of the torsion bar 5. Clearly, this similarly applies even when the reference voltage $V_{ref}$ is different from the power source voltage $V_{cc}$ as denoted by the alternate long and short dash lines in FIG. 2.

As described above, in the present invention, the control circuit 3 calculates the torque applied upon the torsion bar 5 by an equation (4) below.

$$\text{Torque} = (V_{T1} - V_{T2}) \times \text{"torque–voltage conversion coefficient"} \quad (4)$$

Where, "torque–voltage-conversion coefficient": coefficient for converting a voltage into torque $V_{T1}$ and $V_{T2}$ denote the output voltages of the two sensors 1 and 2, and these values are of course inputted to the control circuit 3. Hence, by multiplying the difference $(V_{T1} - V_{T2})$ between the output voltages from the two sensors 1 and 2 by the "torque–voltage conversion coefficient", the torque applied upon the torsion bar 5 can be calculated. It is easy to determine the "torque–voltage conversion coefficient" when the same characteristics of the two sensors 1 and 2 are known, and the "torque–voltage conversion coefficient" may be stored in the control circuit 3 in advance.

The equations (1) and (2) mentioned above are as follows:

$$V_{T1} = (a \times \theta + (V_{cc}/2)) \times (V_{cc}/V_{ref}) \quad (1)$$

$$V_{T2} = (-a \times \theta + (V_{cc}/2)) \times (V_{cc}/V_{ref}) \quad (2)$$

Hence, "$V_{T1} - V_{T2}$" in the equation (4) is calculated by an equation (5) below:

$$V_{T1} - V_{T2} = (2a \times \theta) \times (V_{cc}/V_{ref}) \quad (5)$$

The symbol "a" is a constant (gain) and the symbol "θ" is the torsional angle of the torsion bar 5 in the equation (5) above, and in the case where the reference voltage $V_{ref}$ is 5 V, the power source voltage $V_{cc}$ actually changes by about ±0.2 V. However, since the change of the power source voltage $V_{cc}$ is about 4%, it is possible to ignore this level of error in practice.

As described above, in the case of a sensor whose characteristic is that its output voltage is changed by a change of a power source voltage, e.g., a Hall-effect sensor, its gain (output voltage), its output voltage at a midpoint or the like also changes depending upon the power source voltage, and therefore, it has been difficult to use such a sensor as a sensor for a torque detecting apparatus of an electric power steering apparatus. The present invention described above on the contrary makes it possible to use such a sensor as a highly accurate sensor.

Although a Hall-effect sensor is used as both the sensors 1 and 2 in the embodiment above, any other sensor having a ratiometric characteristic, such as a potentiometer, may be similarly used.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

The invention claimed is:

1. A torque detecting apparatus for detecting torque applied upon a rotation shaft by means of two sensors which simultaneously detect an amount of torsion of said rotation shaft, wherein
    said two sensors have ratiometric characteristics and have the same characteristics, and
    gains of said two sensors are set to the opposite polarities to each other,
    whereby the torque applied upon said rotation shaft is calculated based on a difference between detection outputs from said two sensors.

2. The torque detecting apparatus as set forth in claim 1, wherein said sensor is a Hall-effect sensor.

3. A torque detecting apparatus, comprising: two sensors to each of which a power source voltage is supplied, for outputting as their detection outputs voltage signals changed from a predetermined reference voltage in accordance with an amount of torsion of a rotation shaft being an object to be detected when said reference voltage is equal to said power source voltage, and outputting as their detection outputs voltage signals changed from said voltage signals, which are changed from said predetermined reference voltage in accordance with an amount of torsion of said rotation shaft, in accordance with a ratio between said reference voltage and said power source voltage when said reference voltage and said power source voltage are different from each other; and calculating means for calculating the torque applied upon said rotation shaft based on said detection outputs of said two sensors, wherein
    gains of said two sensors are set to the opposite polarities to each other, and
    said calculating means calculates the torque applied upon said rotation shaft by multiplying a difference between said detection outputs from said two sensors obtained simultaneously detecting the amount of torsion of the same rotation shaft by a predetermined coefficient.

4. The torque detecting apparatus as set forth in claim 3, wherein said sensor is a Hall-effect sensor.

* * * * *